United States Patent [19]
Krauss et al.

[11] Patent Number: 5,761,961
[45] Date of Patent: Jun. 9, 1998

[54] COUNTERSHAFT MANUAL TRANSMISSION FOR MOTOR VEHICLES

[75] Inventors: Christian Krauss; Thomas Wollny, both of Cologne, Germany

[73] Assignee: Ford Global Technologies, Inc., Dearborn, Mich.

[21] Appl. No.: 760,084

[22] Filed: Dec. 4, 1996

[30] Foreign Application Priority Data

Dec. 23, 1995 [DE] Germany ............... 195 48 622.6

[51] Int. Cl.⁶ ............................. B60K 17/08; B60K 23/02
[52] U.S. Cl. ........................ 74/333; 74/325; 74/720; 74/331
[58] Field of Search ................ 74/664, 665 B, 74/720, 325, 331, 333; 192/48.4, 48.5, 3.61

[56] References Cited

U.S. PATENT DOCUMENTS

| | | | |
|---|---|---|---|
| 3,802,293 | 4/1974 | Winckler et al. | 74/331 X |
| 4,594,908 | 6/1986 | Akashi et al. | 74/331 X |
| 4,641,549 | 2/1987 | Muller | 74/720 X |
| 4,823,628 | 4/1989 | Hiraiwa | 74/720 X |
| 5,259,260 | 11/1993 | Schneider | 74/333 X |

FOREIGN PATENT DOCUMENTS

| | | | |
|---|---|---|---|
| 0173117 | 12/1988 | European Pat. Off. | |
| 4031851A1 | 4/1992 | Germany | |
| 0065941 | 4/1985 | Japan | 74/331 |

Primary Examiner—Khoi Q. Ta
Assistant Examiner—William Joyce
Attorney, Agent, or Firm—James J. Dottavio

[57] ABSTRACT

A countershaft transmission is provided for a motor vehicle having a prime mover. The transmission comprises a first input shaft carrying a first input gear, a second input shaft coaxial with the first input shaft carrying a second input gear, and a countershaft carrying a plurality of loose gearwheels, each of the loose gearwheels in meshing engagement with one of the input gears, respectively. A fixed gearwheel is carried by the countershaft in meshing engagement with the gearwheel on the first input shaft. A synchronizing clutch is carried by the countershaft for driving engaging one of the loose gearwheels carried by the countershaft to select a gear ratio. A first clutch is driven by the prime mover. The first clutch is releasably drivably connectable to the first transmission input shaft and the second transmission input shaft. A second clutch is interposed between the first clutch and the second input shaft for drivably connecting the first clutch and the second input shaft. A third clutch is interposed between the first clutch and the input shafts, said third clutch being drivably connectable between the first clutch and the first shaft and the second shaft, alternatively.

6 Claims, 8 Drawing Sheets

COUNTERSHAFT MANUAL TRANSMISSION FOR MOTOR VEHICLES

BACKGROUND OF THE INVENTION

1. Field of the Invention

The invention relates to a countershaft manual transmission for motor vehicles which can be shifted without interrupting the traction force.

2. Discussion of Related Prior Art

German Offenlegungsschrift 40 31 851 discloses a countershaft manual transmission for motor vehicles which can be shifted without interrupting the traction force in which a direct driving connection is provided between a flywheel which forms the input part of a friction clutch and a first transmission input shaft, and the output part of the friction clutch is connected to a second transmission input shaft which is in the form of a hollow shaft embracing the first input shaft. The first input shaft carries most of the fixed gearwheels of the gear steps, and a countershaft disposed parallel to the two input shafts carries most of the loose gearwheels of the gear steps. Dog clutches or synchronizing clutches are fitted between pairs of loose gearwheels on the countershaft in order to shift the individual gear steps.

The fixed gearwheels of the lowest and highest gear steps are carried on the second input shaft and, in contrast to the other gear steps, in the case of the second-highest gear step, the fixed gearwheel is carried on the countershaft and the loose gearwheel is carried on the first input shaft.

With this known countershaft transmission, if the vehicle is to be driven away from rest, a driving connection must be set up between the loose gearwheel of the first speed gear and the countershaft by engaging the selector sleeve for the first speed gear. The drive-away procedure is then performed by controlled engagement of the friction clutch. Then, to shift from first speed gear into second speed gear, the friction clutch must be disengaged at the beginning of the shifting process so that the selector sleeve provided for the first and fifth speed gears can be disengaged from the first speed gear and engaged in fifth speed gear. The friction clutch is now reengaged in a controlled manner so as to bring about matching of the speed of rotation to the engagement speed for the second speed gear by means of the slipping friction clutch in combination with the gearing-up of the fifth speed gear. As soon as the corresponding engagement speed is reached, a smooth shift into the second speed gear can be effected without interruption of the traction force by displacement of the second speed gear selector sleeve.

However, this known countershaft transmission has the disadvantage that through the disengagement of the friction clutch required at the start of the shift from first into second speed gear, a brief interruption of the traction force occurs, which can lead to an undesired revving up of the internal combustion engine.

European specification 0 173 117 discloses a countershaft transmission for motor vehicles, shiftable without interrupting the traction force, in which a prime mover drives through a direct connection a first transmission input shaft which carries a plurality of fixed gearwheels of gear steps and has a countershaft parallel to it which carries a plurality of loose gearwheels for the different gear steps, dog or synchronizing clutches being fitted between respective pairs of loose gearwheels.

Connected nonrotatably to the transmission input shaft, which is directly connected to the prime mover, is the input part of a friction clutch, the output part of which is connected to a second transmission input shaft in the form of a hollow shaft which carries the fixed gearwheels of the fifth speed gear and the reverse gear.

The process of driving the vehicle away is begun by engaging the selector sleeve into the fifth speed gear, after first disengaging the friction clutch. The friction clutch is then engaged in a controlled manner, i.e., so as to slip, so that as soon as the speed of rotation for engagement of the first speed gear is reached, the selector sleeve can be smoothly engaged in the first speed gear and the friction clutch then disengaged so that the torque transfer takes place via the first speed gear gearwheel set. To engage second speed gear, the friction clutch is again slippingly engaged in a controlled manner so that the engagement speed of the second speed gear is obtained. On reaching this speed of rotation, the selector sleeve for second speed gear is shifted in order to bring the second speed gear gearwheel set into use for torque transfer. The friction clutch is then again disengaged.

This known kind of countershaft transmission has the disadvantage that since the drive-away process is carried out using the gear ratio of the highest gear, e.g., the fifth speed gear, the friction clutch has to have considerable frictional or dragging capacity, which means that the simple single-plate friction clutch usually used to produce the force can no longer be used, but a wet multiplate friction clutch running in lubricating oil has to be employed.

SUMMARY OF THE INVENTION

The object of the invention is to provide an improved countershaft manual transmission in which shifting of all gear steps is possible with the use of the simpler, single-plate friction clutch, without any interruption of the torque on changing between first and second speed gears in the critical drive-away region.

To this end, the present invention provides a countershaft manual transmission for motor vehicles, comprising a first input shaft carrying a first input gear, a second input shaft coaxial with the first input shaft carrying a second input gear, and a countershaft carrying a plurality of loose gearwheels, each of the loose gearwheels in meshing engagement with one of the input gears, respectively. A fixed gearwheel is carried by the countershaft in meshing engagement with the gearwheel on the first input shaft. A synchronizing clutch is carried by the countershaft for drivingly engaging one of the loose gearwheels carried by the countershaft to select a gear ratio. A first clutch is driven by the prime mover. The first clutch is releasably drivably connectable to the first transmission input shaft and the second transmission input shaft. A second clutch is interposed between the first clutch and the second input shaft for drivably connecting the first clutch and the second input shaft. A third clutch is interposed between the first clutch and the input shafts, said third clutch being drivably connectable between the first clutch and the first shaft and the second shaft, alternatively.

Thus, the present invention is able to provide for a smooth torque transmission between first and second gears using a simple clutch and prevent over-revving of the engine.

BRIEF DESCRIPTION OF THE DRAWINGS

The invention will now be described in more detail, by way of example, with reference to an embodiment shown in the accompanying drawings, in which.

DETAILED DESCRIPTION OF A PREFERRED EMBODIMENT

The design of the countershaft transmission of the invention is explained with reference to FIG. 1, in which the individual elements of the transmission are provided with corresponding reference symbols, which in the further FIGS. 2 to 8 are merely repeated, with the difference that the transmission elements shifted into the torque path are shown in their shifted positions and the force flow is indicated by bold lines.

Figure 1:
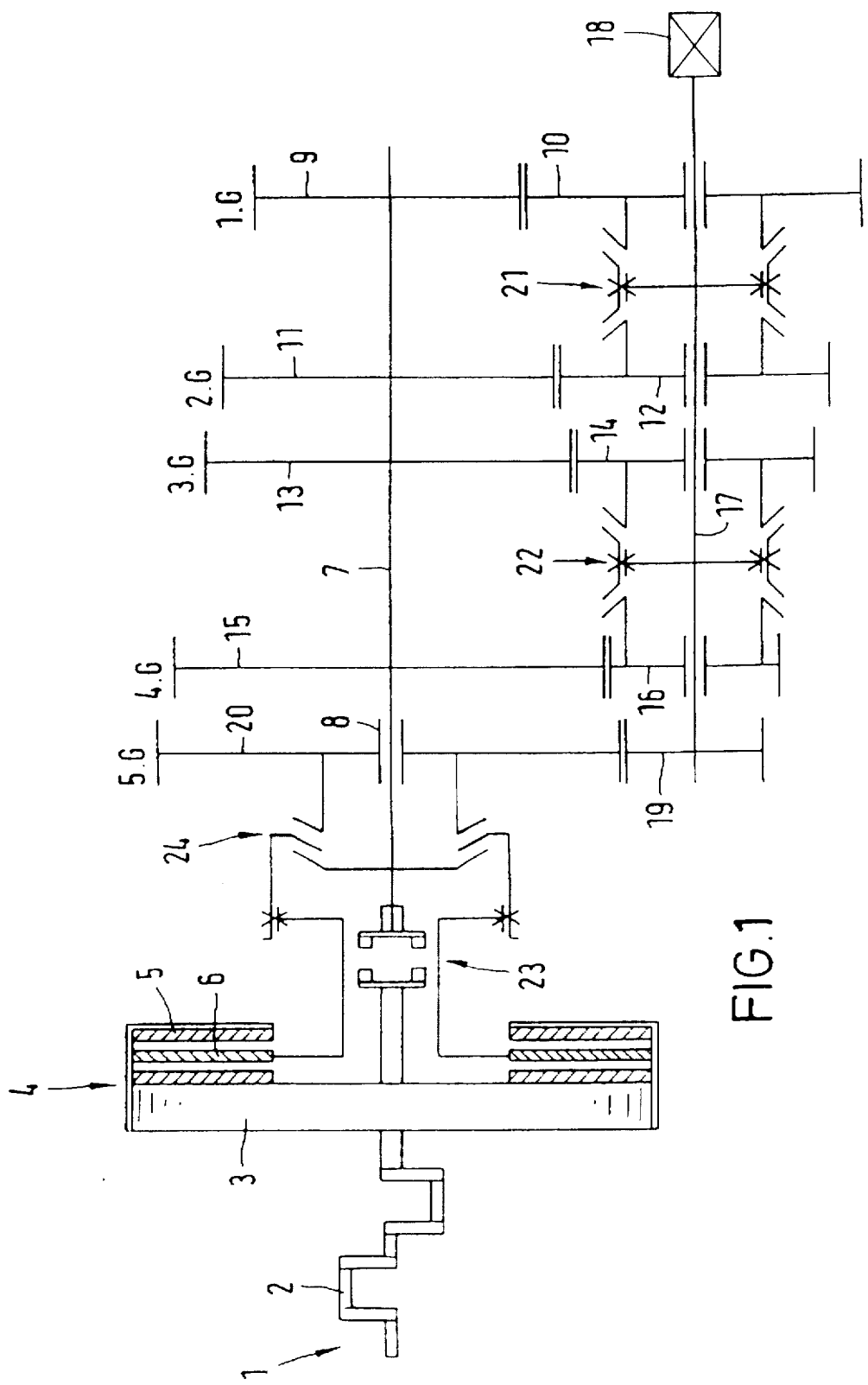
FIG. 1 is a transmission diagram of a countershaft manual transmission in accordance with the invention.

In FIG. 1, the transmission is shown in the Neutral position. A prime mover 1, preferably an internal combustion engine having a crankshaft 2, drives a flywheel 3 which is connected in conventional manner to a friction type plate clutch 4 that consists essentially of an input element 5 and an output element 6.

The countershaft transmission comprises a first transmission input shaft 7 and a second transmission input shaft 8, the second transmission input shaft being in the form of a hollow shaft 8 embracing the first input shaft 7. The countershaft transmission includes gearwheel sets for gears 1 to 5, the fixed gearwheels 9, 11, 13, and 15 preferably being carried on the first input shaft 7 and their counter-wheels or loose gearwheels 10, 12, 14 and 16 being carried on a countershaft 17 disposed parallel to the input shafts 7 and 8. The countershaft 17 is connected to a final takeoff 18.

Of the gearwheel set 19 and 20 of the fifth speed gear, the fixed gearwheel 19 is fixed on the countershaft 17 and the loose gearwheel 20 is carried on the second input shaft 8. Synchronizing clutches with corresponding selector sleeves 21 and 22 are located in known manner between two adjacent loose gearwheels 10, 12 and 14, 16, respectively, to provide the selectable gear ratios as is known in the art.

In contrast to the known state of the art, the direct connection between the flywheel 3 and the first input shaft 7 is in the form of a shiftable dog clutch 23, and the output element 6 of the friction clutch 4 is not in direct driving connection with the first input shaft 7, but can either be connected to this shaft via a shiftable synchronizing clutch 24, or connected to the loose gearwheel 20 of the fifth speed gear, carried on the hollow shaft 8.

The way in which the countershaft transmission of the invention functions is explained below with reference to FIGS. 2 to 8, in which the transmission elements forming the respective torque transfer paths are emphasized by bold lines.

Figure 2:
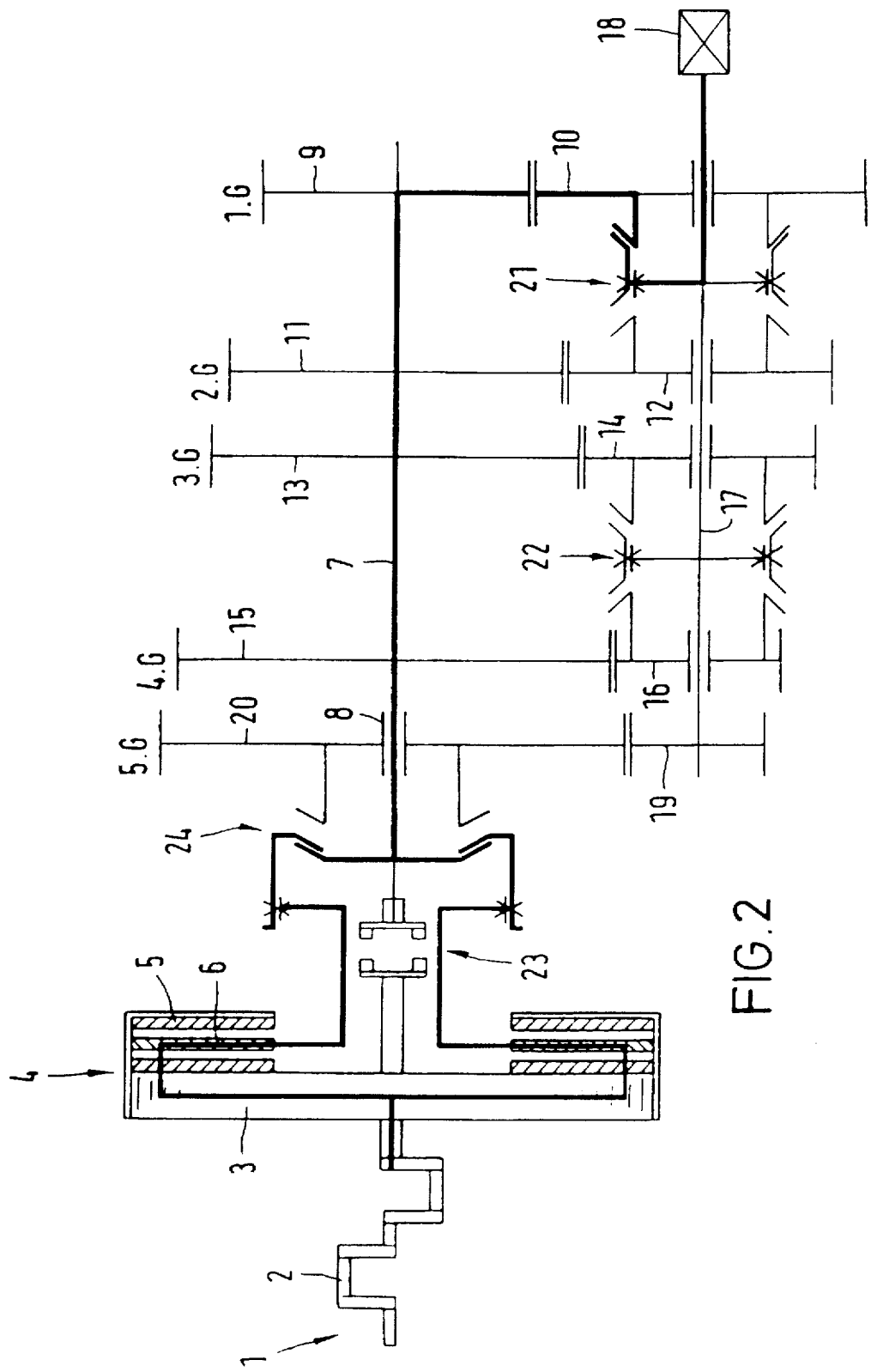
FIG. 2 shows the transmission diagram of FIG. 1 in the shift position for driving away from rest.

FIG. 2 shows the transmission diagram of FIG. 1 in the shift position for driving away from rest, the parts of the transmission forming the torque transfer path being shown in their corresponding shift positions and the torque path being represented by bold lines. In the drive-away process, in which, with the friction clutch 4 at first still disengaged, the synchronizing clutch 24 is displaced so that a driving connection is first established between the output element 6 of the friction clutch and the first input shaft. When torque is now transferred by controlled engagement of the friction clutch 4, this torque is transferred via the synchronizing clutch 24 to the first input shaft 7 and from this via the gearwheel set of the first speed gear and the synchronizing clutch 21 located on the countershaft in the first speed gear position to the countershaft, and passed on to the final takeoff 18.

The shiftable synchronizing clutch 24 between the output 6 side of the friction clutch 4 and the two transmission input shafts 7, 8, enables the drive-away process to be performed by means of the controlled friction clutch 4 and the gear ratio of the first speed gear 9, 10, with the direct connection between the input side of the friction clutch 4 and the first transmission input shaft 7 by the shiftable dog clutch 23 only then being made.

Figure 3:
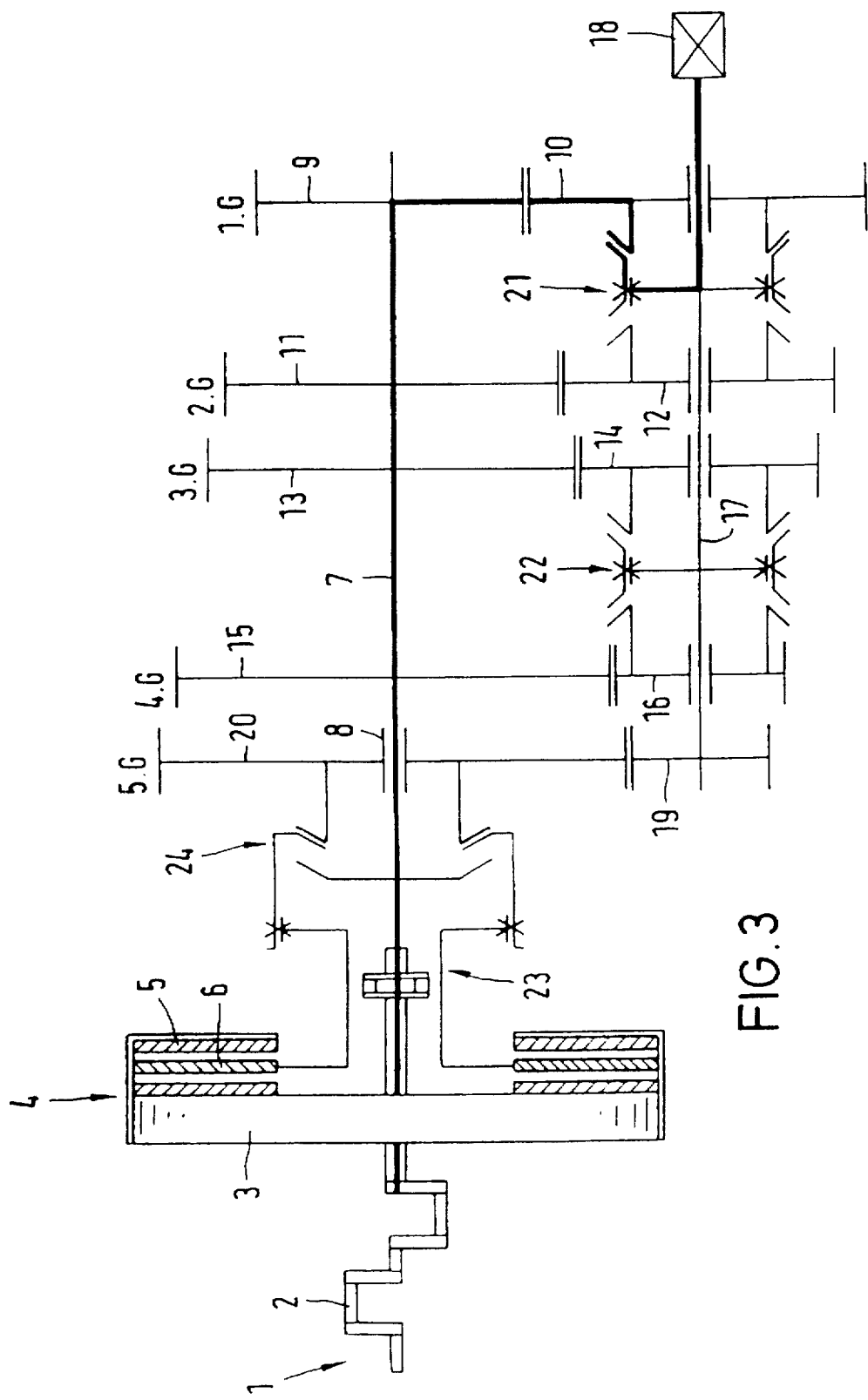
FIG. 3 shows the transmission diagram of FIG. 1 after the completion of the drive-away process in first gear.
Figure 4:
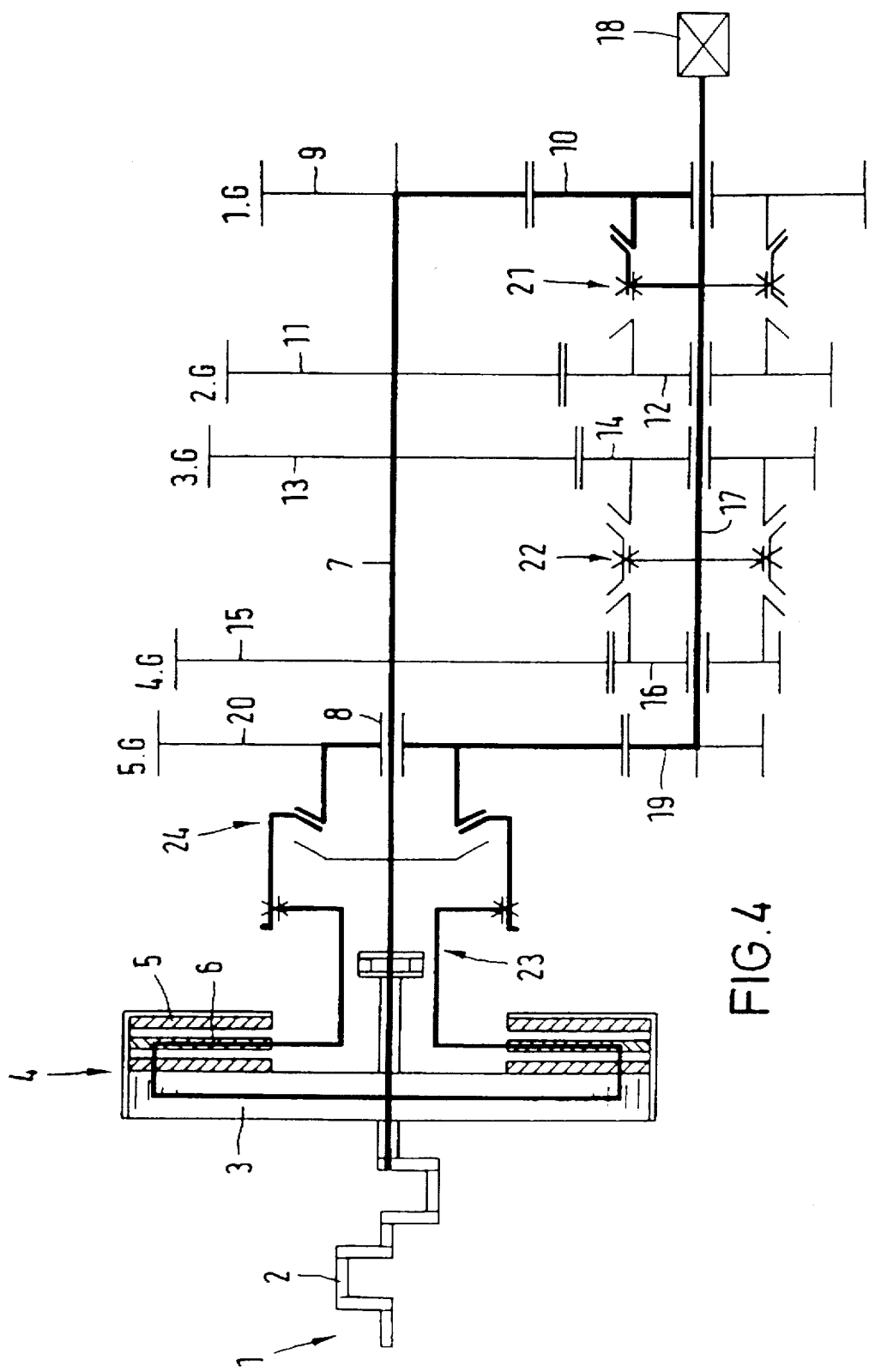
FIG. 4 shows the transmission diagram in the shift position for the preparatory phase for a shift from first into second speed gear.

Once the drive-away process is completed, then, as can be seen from FIG. 3, the friction clutch 4 is disengaged and, in its place, the dog clutch 23 is engaged, thus establishing a direct driving connection between the flywheel 3 and the first input shaft 7. The further torque flow is still via the gearwheel set of the first speed gear and its synchronizing clutch to the countershaft and to the final takeoff.

Figure 5:
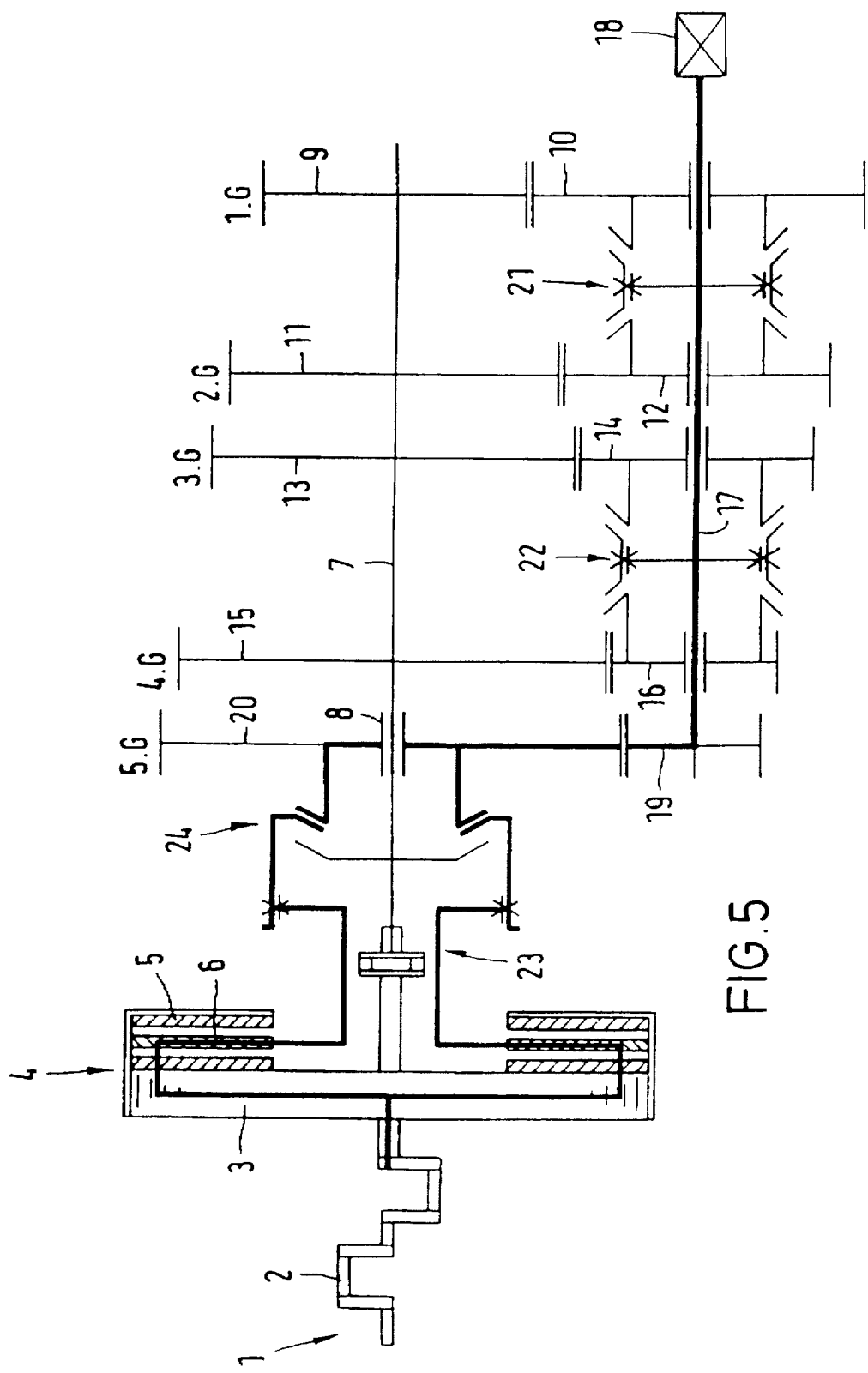
FIG. 5 shows the transmission diagram of FIG. 1 during the synchronization phase for a shift from first into second speed gear.
Figure 6:
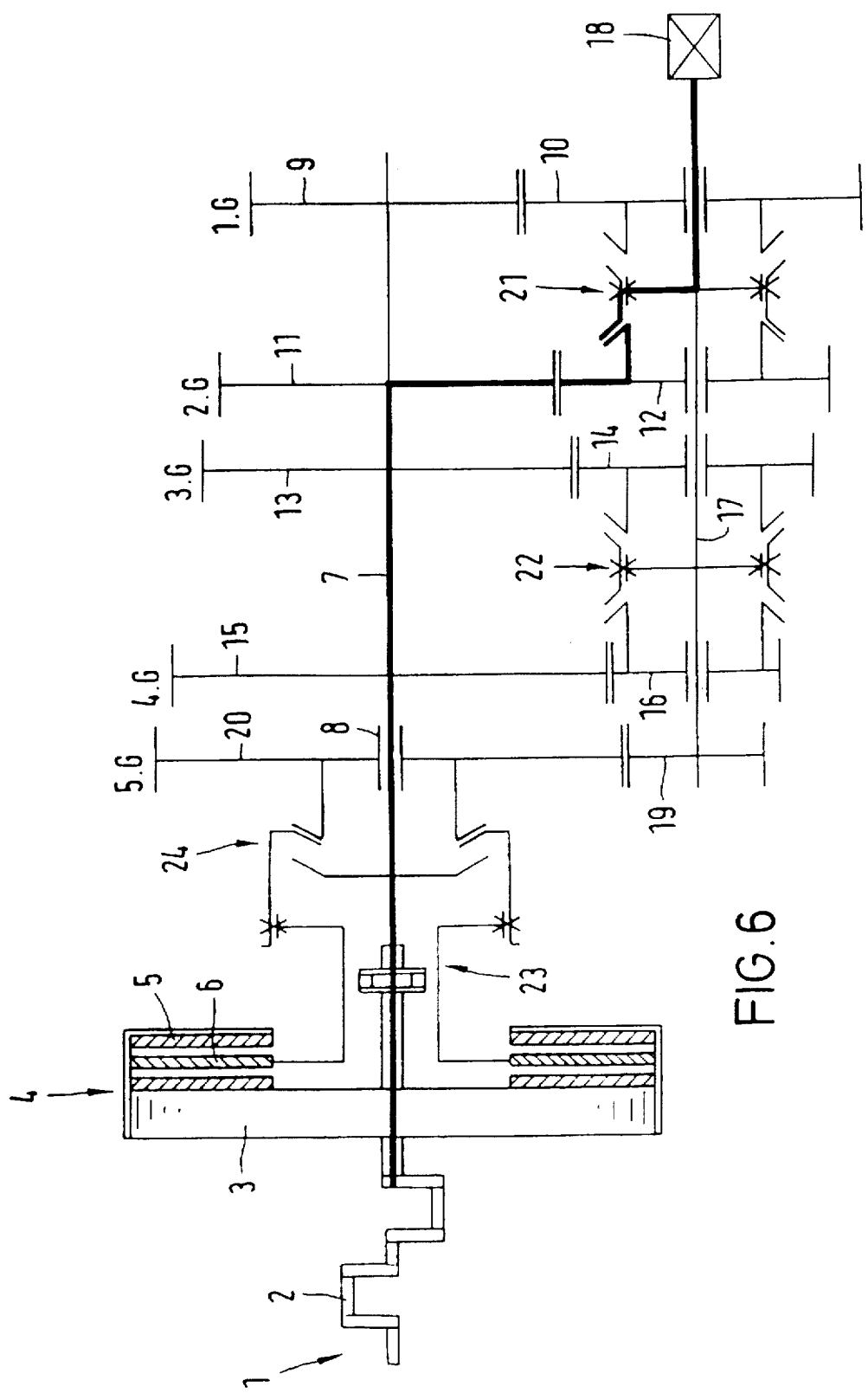
FIG. 6 shows the transmission diagram of FIG. 1 in its shift position after completion of a shift from first into second speed gear.
Figure 7:
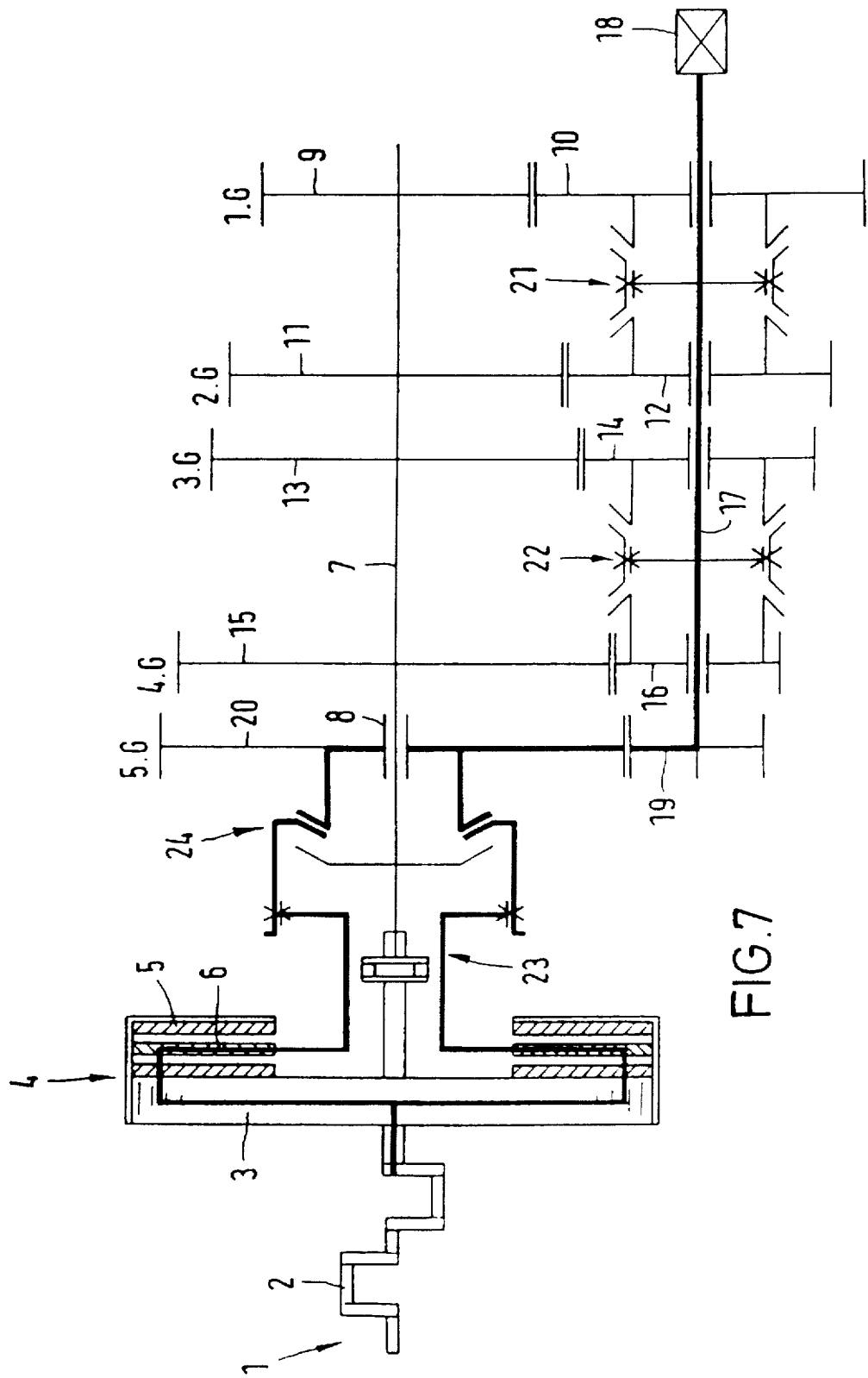
FIG. 7 shows the transmission diagram of FIG. 1 in the preparatory phase for a shift from second into first speed gear.
Figure 8:
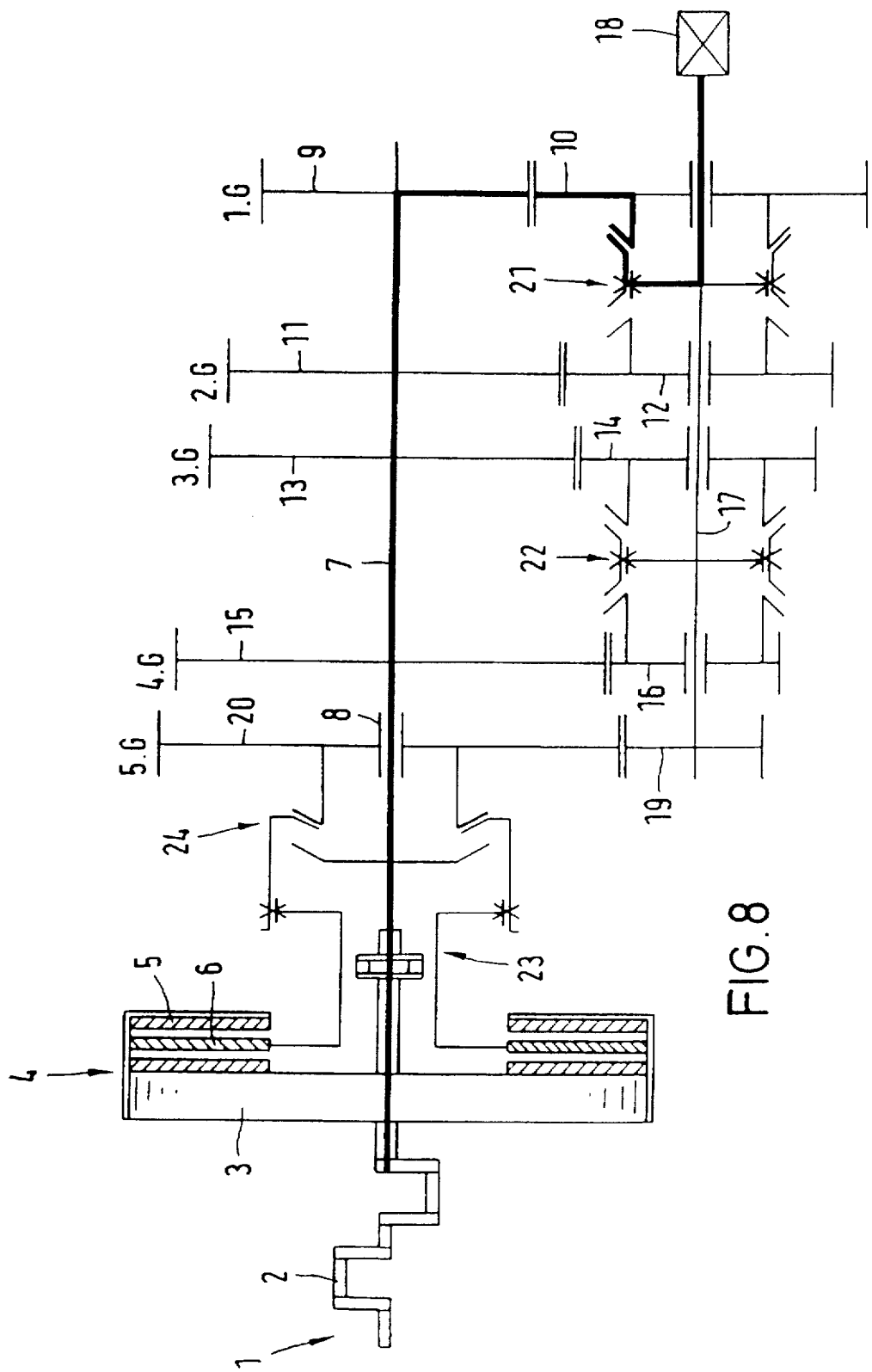
FIG. 8 shows the transmission diagram of FIG. 1 after the shift from second into first speed gear has been carried out.

When starting from the shift position shown in FIG. 3, and preparation made for a shift from first into second speed gear, the synchronizing clutch 24 is first brought into engagement with the loose gearwheel 20 of the fifth speed gear and the friction clutch 4 is then engaged in controlled manner until the torque flow passing through the gearwheel set of the fifth speed gear removes the load from the first gear gearwheel set so that this can be shifted into the neutral position, as shown in FIG. 5, and then into the second speed gear position, shown in FIG. 6. After this shift, the friction clutch 4 is again disengaged and the torque transfer flow runs via the dog clutch 23 and the gear set of the second speed gear.

When a downshift from second gear to first speed gear is to take place, the friction clutch 4 is again engaged in controlled manner so that it transfers torque via the synchronizing clutch 24, which is still engaged, to the loose gearwheel 20 of the fifth speed gear, continuing until the gearwheel set of the second gear is again torque-free, since the fifth gear, engaged with the clutch slipping, takes over the torque transfer. Hence, a shift of the synchronizing clutch from the second speed gear position into the neutral position and then into the first speed gear position can again take place without any problems, and by disengagement of the friction clutch 4, a torque flow via the dog clutch 23 and the gearwheel set of the first gear is again provided.

The countershaft transmission design in accordance with the invention gives the advantage that the drive-away process can take place via the gearwheel set of the first speed gear, and at the same time ensures, by means of the additional clutches 23 and 24, that during a gear change from first to second speed gear and the disengagement of the friction clutch that is needed for this, no over-revving of the prime mover can occur.

When the friction clutch is disengaged to shift from first into second speed gear, a torque path is still maintained via the engaged dog clutch 23 to the gearwheel set of the first speed gear 9, 10, and no annoying over-revving of the engine occurs. The shiftable synchronizing clutch 24 connected to the output side of the friction clutch 4 is now brought into engagement with the gearwheel set 20, 19 of the fifth speed gear and the friction clutch 4 is again engaged in a controlled manner. As soon as the speed of rotation for engagement of the second speed gear is reached, the selector sleeve 21 of the second speed gear is displaced in order to bring about force-locking of the gearwheel set of the second speed gear 12, 11, and after disengagement of the friction clutch 4 the torque transfer now takes place exclusively via the gearwheel set of the second speed gear 12, 11.

Of course, following the combination of the controlled friction clutch 4 and the input shafts 7 and 8 in accordance with the invention, any number of different transmission layouts are possible without departing from the scope of the present invention.

Thus, for example, the output element of the friction clutch can be selectively connected to the loose gearwheel of the highest gear, to the first input shaft, or to any desired other loose gearwheel of a gear speed.

The output element of the friction clutch can also be selectively connected via further clutches to any desired loose gearwheels or to the first input shaft.

Instead of the simple friction clutch, it is, of course, possible to use a wet multiplate clutch or some other suitable clutch.

It is to be understood that the specific mechanisms and techniques which have been described are merely illustrative of one application of the principles of the invention. Numerous modifications may be made to the methods and apparatus described without departing from the true spirit and scope of the invention.

We claim:

1. A countershaft transmission for a motor vehicle having a prime mover, the transmission comprising:

a first input shaft carrying a first input gear;

a second input shaft coaxial with the first input shaft carrying a second input gear;

a countershaft carrying a loose gearwheel in meshing engagement with the second input gear and a fixed gearwheel in meshing engagement with the first input gear;

a synchronizing clutch carried by the countershaft for driving engagement with the loose gearwheel to select a gear ratio;

a first clutch driven by the prime mover, the first clutch being releasably drivably connectable to the first input shaft and the second input shaft by way of a third clutch;

a second clutch interposed between the first clutch and the second input shaft for drivably connecting the first clutch and the second input shaft; and said third clutch interposed between the first clutch and the input shafts, said third clutch being drivably connectable between the first clutch and the first input shaft and the second input shaft, alternatively.

2. A countershaft transmission for motor vehicles according to claim 1, wherein the second clutch comprises a dog clutch.

3. A countershaft transmission for motor vehicles according to claim 2, wherein the first clutch comprises a wet multiplate clutch.

4. A countershaft transmission for motor vehicles according to claim 3, wherein the third clutch comprises a synchronizing clutch.

5. A countershaft transmission for motor vehicles according to claim 4, wherein the first input shaft comprises a hollow shaft partially coextensive with the second input shaft.

6. A countershaft transmission for motor vehicles according to claim 5, wherein the second input shaft carries a plurality of input gears and the countershaft carries a corresponding loose gearwheel in meshing engagement with each of said plurality of input gears carried by the second input shaft.

* * * * *